(12) United States Patent
Kodden

(10) Patent No.: US 9,259,120 B2
(45) Date of Patent: Feb. 16, 2016

(54) BREW BEVERAGE DEVICE WITH PRESSURE RELEASE

(75) Inventor: Hans J. Kodden, Hoogeveen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1240 days.

(21) Appl. No.: 11/575,308

(22) PCT Filed: Sep. 14, 2005

(86) PCT No.: PCT/IB2005/053009
§ 371 (c)(1),
(2), (4) Date: Mar. 14, 2007

(87) PCT Pub. No.: WO2006/033049
PCT Pub. Date: Mar. 30, 2006

(65) Prior Publication Data
US 2008/0314257 A1    Dec. 25, 2008

(30) Foreign Application Priority Data
Sep. 20, 2004  (EP) .................................. 04104526

(51) Int. Cl.
*A47J 31/24*   (2006.01)
*A47J 31/46*   (2006.01)
*A47J 31/36*   (2006.01)
*A47J 27/092*  (2006.01)

(52) U.S. Cl.
CPC ............. *A47J 31/46* (2013.01); *A47J 31/3623* (2013.01); *A47J 27/092* (2013.01)

(58) Field of Classification Search
CPC ..... A47J 27/092; A47J 31/3623; A47J 31/00; A47J 31/002; A47J 31/44; A47J 31/4403; A47J 31/46–31/467
USPC ............. 99/302 R, 292, 297, 301, 302 P, 309, 99/279, 300, 295, 293, 280, 316; 426/231, 426/431, 433; 222/146.2, 146.4, 146.5; 137/102, 107
See application file for complete search history.

(56) References Cited

U.S. PATENT DOCUMENTS 2,815,041 A * 12/1957 Rimsha et al. ............ 137/625.65
2,902,048 A *  9/1959 Ryan, Jr. ........................ 137/510
(Continued)

FOREIGN PATENT DOCUMENTS

EP    0542045 A1   5/1993
GB    2371213 A    7/2002
(Continued)

OTHER PUBLICATIONS

Ex Parte Gary M. Katz.*

*Primary Examiner* — Dana Ross
*Assistant Examiner* — Brandon Harvey

(57) ABSTRACT

A beverage making device comprising a brewing chamber for enclosing a pad containing a substance from which the beverage is brewed. A water supply conduit is present between pumping means and the brewing chamber. The brewing chamber has an outlet having an orifice through which the brewed beverage can leave the brewing chamber. A portion of the wall of the brewing chamber is stationary and the other portion of the wall can move away from the stationary part in order to open the brewing chamber. Means (1) are present for releasing pressure from the brewing chamber after the water supply to the brewing chamber has been terminated.

8 Claims, 1 Drawing Sheet

(56) References Cited

U.S. PATENT DOCUMENTS

| | | | | |
|---|---|---|---|---|
| 3,431,902 | A | * | 3/1969 | Vischer, Jr. ..................... 126/20 |
| 3,435,839 | A | * | 4/1969 | Elder ............................ 137/102 |
| 3,443,508 | A | * | 5/1969 | Reynolds et al. ............... 99/282 |
| 3,460,558 | A | * | 8/1969 | Johannisson ................ 137/102 |
| 3,519,012 | A | * | 7/1970 | Van Patten ................... 137/102 |
| 4,057,074 | A | * | 11/1977 | Fischer ......................... 137/107 |
| 4,457,330 | A | * | 7/1984 | Fields ........................... 137/102 |
| 4,689,237 | A | * | 8/1987 | Fabre ............................ 426/521 |
| 4,733,919 | A | * | 3/1988 | Jacobs et al. ................... 303/28 |
| 4,976,279 | A | * | 12/1990 | King et al. .................... 137/107 |
| 5,265,519 | A | * | 11/1993 | Schiettecatte et al. .......... 99/293 |
| 5,299,595 | A | * | 4/1994 | Ribeiro ......................... 137/107 |
| 5,715,742 | A | * | 2/1998 | Cheich et al. .................. 99/308 |
| 5,778,765 | A | * | 7/1998 | Klawuhn et al. ............... 99/290 |
| 6,142,063 | A | * | 11/2000 | Beaulieu et al. ................ 99/283 |
| 6,263,519 | B1 | * | 7/2001 | Parsons et al. .................... 4/313 |
| 6,382,083 | B2 | * | 5/2002 | Schmed ...................... 99/289 R |
| 2003/0111178 | A1 | * | 6/2003 | Morita ..................... 156/345.33 |
| 2004/0025701 | A1 | | 2/2004 | Colston |
| 2004/0079237 | A1 | * | 4/2004 | Denisart ......................... 99/275 |
| 2005/0016596 | A1 | * | 1/2005 | Mijers ...................... 137/512.15 |
| 2005/0172833 | A1 | * | 8/2005 | Ioannone et al. ............... 99/453 |
| 2006/0096464 | A1 | * | 5/2006 | Blanc ............................. 99/279 |
| 2008/0178743 | A1 | * | 7/2008 | Hug et al. ...................... 99/304 |

FOREIGN PATENT DOCUMENTS

| | | |
|---|---|---|
| JP | 63098132 U | 6/1988 |
| JP | 2289210 A | 11/1990 |
| WO | 02058523 | 8/2002 |
| WO | WO 2005004684 A1 * | 1/2005 |

* cited by examiner

BREW BEVERAGE DEVICE WITH PRESSURE RELEASE

The invention is related to a beverage making device comprising a brewing chamber for enclosing a pad containing a substance from which the beverage is brewed, and a water supply conduit between pumping means and the brewing chamber for supplying pressurized water, in particular hot water, to the brewing chamber, and an outlet having an orifice through which the brewed beverage can leave the brewing chamber, in which a portion of the wall of the brewing chamber is stationary and the other portion of the wall can move away from the stationary part in order to open the brewing chamber. The expression "pad" means any container comprising a substance for brewing a beverage. It can be a disk-like container made of filtering paper containing the substance from which the beverage is brewed, but it can also be any other container enclosing the required substance.

A beverage-making device as described above is disclosed in WO-A-01/15582. The disclosed device comprises a water reservoir and means for heating the water and means for pumping the heated water to openings in the upper wall of the brewing chamber, so that the heated water can enter the brewing chamber under pressure. The brewing chamber encloses a pad, also called a pouch, made of filter material and containing a substance to be extracted, for example ground coffee. The heated water will pass through the pad, so that the coffee is extracted. During the extraction process, the brewed beverage (coffee) leaves the brewing chamber through an outflow opening in the bottom of the brewing chamber and arrives in a beverage collection chamber. The beverage collection chamber comprises an outflow tube extending outside the device, so that the brewed beverage (coffee) can be caught by one or two cups. The portion of the device comprising the upper wall of the brewing chamber can hinge upwardly with respect to the stationary part of the brewing chamber, in order to give access to the brewing chamber, so that a new pad can be inserted for a next extraction process.

By means of the device, a beverage can be made by an extraction process, for example to produce coffee, or by a dissolving process, for example to produce a chocolate drink. In case of an extraction process, the extracted substance will remain in the pad and the pad with the extracted substance must be removed from the brewing chamber after the brewing process. In case of a dissolving process, the substance in the pad will disappear during the brewing process, and the empty pad must be removed from the brewing chamber. The pad may contain a rigid or an elastic internal framework to maintain its outside dimensions during the dissolving process.

The orifice in the outlet of the brewing chamber may have two functions. Firstly, it may determine the period of time that the pressurized water will remain in the brewing chamber, so that the brewing process can take place properly. Furthermore, the orifice will produce a jet of the brewed beverage, which jet can be directed to a surface, for example to produce foam or bubbles. In case of brewing coffee, such foam on top of the coffee is a desired feature of the brewed beverage.

During the brewing process the brewing chamber is sealed, so that the brewed beverage can only leave the brewing chamber through said outlet provided with the orifice. In order to remove the pad after the brewing process is terminated, the brewing chamber must be opened. Therefore, a portion of the wall of the brewing chamber is stationary, and the other portion of the wall can move away from said stationary portion. In order to make sure that the pressure in the brewing chamber does not push said two portions of the wall away from each other, the brewing chamber is locked by means of a locking mechanism. Thereby, for safety reasons, the locking mechanism of the brewing chamber may be such that said two portions can only move away from each other after they are moved a little towards each other.

In practice it has appeared that sometimes there is more or less resistance against opening of the brewing chamber, i.e. the brewing chamber cannot be opened always in the same easy way.

The object of the invention is a beverage making device comprising a brewing chamber, whereby a part of the wall of the brewing chamber is stationary and the other portion of the wall can move away from the stationary portion in order to open the brewing chamber, and whereby the brewing chamber can always be opened easily, except during the period that the pumping means supply pressurized water into the brewing chamber.

In order to achieve this object, means are present for releasing pressure from the brewing chamber after the water supply to the brewing chamber has been terminated. It has been found out that from time to time, after the supply of pressurized water is terminated, the pressure in the brewing chamber remains present for some time, resulting in perceptible resistance when opening the brewing chamber. Because the pumping means comprise preferably a positive-displacement pump, the water cannot flow back through the pump after the pumping action has stopped. The presence of pressure in the brewing chamber appeared to be caused by blockage of the orifice in the outlet of the brewing chamber. Such blockage can be caused by particles of the substance from which the beverage is brewed, or by parts of the pad, in case the pad is damaged. Such pressure in the brewing chamber can be avoided by providing means for releasing pressure from the brewing chamber after the water supply to the brewing chamber has been terminated.

In one preferred embodiment, said means for releasing pressure comprise a pressure release valve in said water supply conduit. Thereby, the opening or openings in the wall of the brewing chamber for supplying water can also be used as opening for releasing pressure from the brewing chamber, so that no additional openings in the wall of the brewing chamber are required.

Preferably, said pressure release valve comprises an inlet connected to said pumping means by one part of said water supply conduit, and a first outlet connected to the brewing chamber by the other part of said water supply conduit, and a second outlet connected to a space having no or low pressure, means being present to close and open said second outlet. Said second outlet can be connected to the water reservoir from which the water is pumped to the brewing chamber, however, preferably, said second outlet is connected to the outlet of the brewing chamber beyond said orifice, for example to the beverage collection chamber.

In one preferred embodiment, the pressure release valve comprises a moveable member that can move between a first position, in which said second outlet is open, and a second position, in which said second outlet is closed, said moveable member being moved by the dynamic pressure variation of the water supplied by the pumping means. An efficient control of the closing and opening of the second outlet can be obtained by making such control dependent on the dynamic pressure of the water pumped to the brewing chamber.

Preferably, said moveable member closes said inlet in said first position, so that the water cannot flow back in the direction of the pumping means through said water supply conduit.

In one preferred embodiment, said moveable member is a membrane dividing a space in the valve housing in two parts, the first part being connected to the inlet and the second part being connected to both said first outlet and said second outlet, said membrane comprising an opening between said two parts, and said membrane being forced by spring means to said first position in which position it closes the inlet and said membrane can be forced to the second position by pressure in said first part, in which position it closes said second outlet. As a result, a simple and reliable pressure release valve is obtained.

The invention is furthermore related to a method for making a beverage by means of a device comprising a brewing chamber that encloses a pad containing a substance from which the beverage is brewed, and a water supply conduit between pumping means and the brewing chamber, which conduit supplies pressurized water to the brewing chamber, and an outlet having an orifice through which the brewed beverage leaves the brewing chamber, after the water supply to the brewing chamber has been terminated, pressure being released from the brewing chamber by pressure release means.

The invention will now be further elucidated by means of a description of an embodiment of a pressure release valve for a beverage making device, which pressure release valve is located in the water supply conduit for pumping pressurized water to the brewing chamber of the beverage making device, for example the device as disclosed in WO-A-01/15582. Thereby reference is made to the drawing comprising figures which are only schematic representations, wherein.

Figure 1:
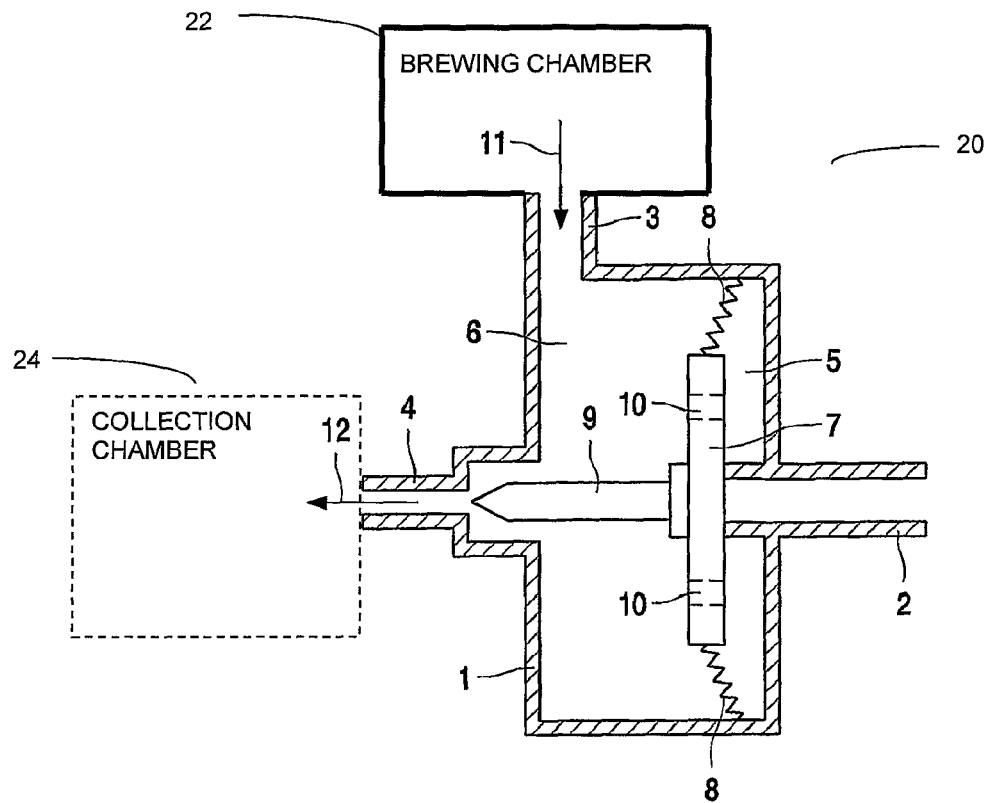
FIG. 1 shows the pressure release valve in open position.
Figure 2:
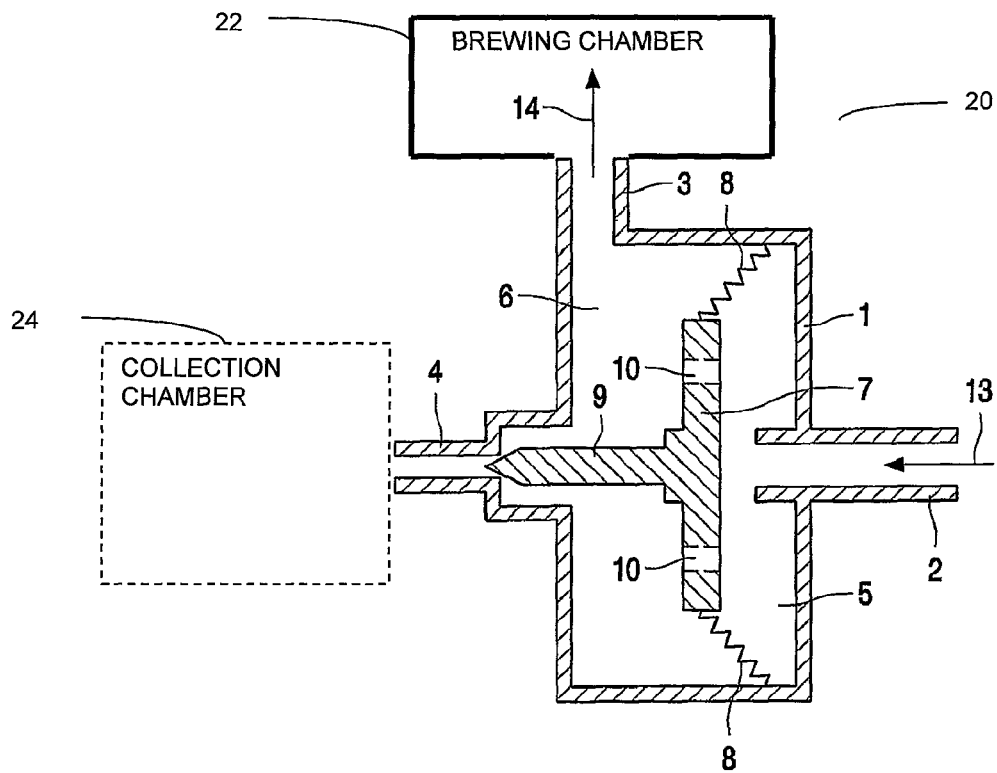
FIG. 2 shows the pressure release valve in closed position.

Both FIGS. 1 and 2 show schematically the valve housing 1 of the pressure release valve. The valve has an inlet 2 which is connected to a pumping means of a beverage-making device 20, so that heated water can be pumped to the valve through inlet 2. The pressure release valve has two outlets, a first outlet 3 and a second outlet 4. First outlet 3 is connected to the a brewing chamber 22 of the beverage-making device 20, and second outlet 4 is connected to a beverage collection chamber 24 of the beverage-brewing device 20, which chamber 24 collects the brewed beverage and is located beyond the outlet of the brewing chamber.

The space inside the housing 1 is divided in two parts, a first part 5 and a second part 6. Between the two parts 5,6, is a membrane having a central rigid portion 7 surrounded by a flexible portion 8. The outer circumference of the flexible portion 8 is attached to the housing 1. Thereby the housing 1 can be divided in two parts the outer circumference of the membrane 7,8 being clamped between the two parts. The inner edge of the flexible portion 8 of the membrane is attached to the outer edge of the central rigid portion 7 of the membrane.

The membrane 7,8 is provided with a central protrusion 9. The membrane 7,8 can move between a first position as shown in FIG. 1 and a second position as shown in FIG. 2. The central rigid portion 7 of the membrane is provided with a number of holes 10, which holes 10 connect the two parts 5,6 of the space inside the housing 1. In FIG. 1 the central rigid portion 7 of the membrane is represented in normal view, and in FIG. 2 the central rigid portion 7 of the membrane is represented in sectional view.

FIG. 1 shows the first position of membrane 7,8, in the central rigid portion 7 of the membrane closes the inlet 2 of the pressure release valve. The central rigid portion 7 of the membrane is forced to the right by a spring force of the flexible portion 8 of the membrane. In this first position of the membrane 7,8 the first outlet 3 of the valve is connected with the second outlet 4. Thereby a flow of liquid from first outlet 3 to second outlet 4 can be present, as indicated with arrows 11 and 12 respectively.

FIG. 2 shows the second position of membrane 7,8, wherein the central rigid portion 7 of the membrane is displaced to the left, so that the central protrusion 9 of the membrane closes the second outlet 4. Thereby a liquid flow can be present from, the inlet 2 to the first outlet 3, as indicated by arrows 13 and 14' respectively.

The pressure release valve functions as follows. As long as the pumping means of the beverage making device is pumping pressurized water through the water supply conduit to the brewing chamber, the water will pass the pressure release valve, which valve is present in said water supply conduit. The pressurized water enters the pressure release valve through inlet 2 (arrow 13 in FIG. 2) and pushes the membrane 7,8 to the left into said second position, as shown in FIG. 2. The water can pass the membrane 7,8 through the holes 10, so that the water can leave the valve through outlet 3 (arrow 14) towards the brewing chamber of the beverage-making device. The second outlet 4 is closed then.

At the moment that the pumping means terminate the supply of water, the flow (arrow 13) through inlet 2 stops, and the membrane is forced to the right by the spring force of the flexible portion 8 of the membrane. Thereby the inlet 2 is blocked, so that no water can flow back towards the pumping means of the beverage-making device. At the same time the second outlet 4 will be opened, as shown in FIG. 1, so that liquid can escape through second outlet 4 as indicated by arrow 12. Therefore, any excess of pressurized liquid can escape from the brewing chamber through outlet 3 (arrow 11) and outlet 4 (arrow 12).

The embodiment as described above is merely an example of a pressure release valve; a great many other embodiments are possible.

The invention claimed is:

1. A beverage making device comprising a brewing chamber configured to brew a beverage, the device comprising:
   a pressure release valve assembly comprising: a housing having
      an inlet for receiving pressurized water into the housing;
      a two way passage configured
         to send the water out of the housing to the brewing chamber, and
         to receive a brewed beverage from the brewing chamber into the housing;
      an outlet configured to remove the brewed beverage from the housing; and
      a membrane having an outer portion attached to the housing and configured to divide the housing into a first part including the inlet and a second part including the outlet and the two way passage,
   wherein the pressure release valve assembly is configured to
      close the outlet when the pressurized water is supplied to the brewing chamber through the inlet and the two way passage, and
      close the inlet when the pressurized water is not provided to the inlet.

2. The beverage making device as claimed in claim 1, wherein the membrane further comprises an inner portion that is movable within the housing.

3. The beverage making device as claimed in claim 2, wherein the membrane comprises: at least on moveable rigid portion and at least one moveable flexible portion for controlling passage of the water into the housing through the inlet and out of the housing through the two way passage, and passage of the beverage into the housing through the two way passage and exit from the housing via the outlet.

4. The beverage making device as claimed in claim 3, wherein the rigid portion is movable between a first position in which the outlet is open and a second position in which the outlet is closed, the rigid portion is movable by a pressure variation of the water supplied through the inlet.

5. The beverage making device as claimed in claim 4, wherein the inlet is closed in the first position and open in the second position.

6. The beverage making device as claimed in claim 1, wherein the membrane comprises a rigid portion and a flexible portion that together separate the first and second parts, the rigid portion comprising at least one opening between the first and second parts.

7. The beverage making device as claimed in claim 6, wherein the inlet includes a protrusion inside the chamber and the rigid portion is wider than a cross section of the inlet.

8. A method for making a beverage using a beverage making device comprising a brewing chamber for brewing a beverage in response to receiving pressurized water, the method comprising acts of:
  providing a pressure release valve including a housing having,
    an inlet for supplying the pressurized water into the housing
    a two way passage for sending the water out of the housing to the brewing chamber, and receiving a brewed beverage from the brewing chamber into the housing, and
    an outlet configured to dispense the brewed beverage from the housing, and
    a membrane having an outer portion attached to the housing dividing the housing into a first part including the inlet and a second part including the outlet and the two way passage;
  providing pressurized water to the inlet thereby moving the membrane to close the outlet, wherein when the outlet is closed:
    providing the pressurized water to the brewing chamber via the inlet, the housing and the two way passage respectively, and
    preventing the pressurized water from leaving the housing via the outlet; and
  stopping flow of the pressurized water to the inlet thereby moving the membrane to close the inlet, wherein when the inlet is closed:
    preventing receipt of the pressurized water into the housing via the inlet, and
    dispensing the beverage from the brewing chamber, via the housing and the outlet.

* * * * *